(12) United States Patent
Kolich

(10) Patent No.: US 8,220,869 B2
(45) Date of Patent: Jul. 17, 2012

(54) TEMPERATURE-AND-HUMIDITY-CONTROLLED HEAD RESTRAINT

(75) Inventor: Michael Kolich, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 332 days.

(21) Appl. No.: 12/609,035

(22) Filed: Oct. 30, 2009

(65) Prior Publication Data

US 2011/0101741 A1    May 5, 2011

(51) Int. Cl.
*A47C 31/00* (2006.01)

(52) U.S. Cl. ........... 297/180.1; 297/180.12; 297/180.13; 297/180.14

(58) Field of Classification Search ............... 297/180.1, 297/180.12–180.14, 217.3
See application file for complete search history.

(56) References Cited

U.S. PATENT DOCUMENTS

| | | | | |
|---|---|---|---|---|
| 3,101,660 A | * | 8/1963 | Taylor | 454/120 |
| 4,306,747 A | * | 12/1981 | Moss | 297/180.12 |
| 5,450,894 A | | 9/1995 | Inoue et al. | |
| 6,196,627 B1 | * | 3/2001 | Faust et al. | 297/180.14 |
| 6,481,801 B1 | * | 11/2002 | Schmale | 297/452.27 |
| 6,487,739 B1 | * | 12/2002 | Harker | 5/726 |
| 6,604,785 B2 | | 8/2003 | Bargheer et al. | |
| 6,746,076 B2 | * | 6/2004 | Bogisch et al. | 297/180.14 |
| 6,761,399 B2 | * | 7/2004 | Bargheer et al. | 297/180.12 |
| 6,869,140 B2 | * | 3/2005 | White et al. | 297/180.13 |
| 7,040,698 B2 | * | 5/2006 | Park et al. | 297/217.3 |
| 7,168,758 B2 | * | 1/2007 | Bevan et al. | 297/180.13 |
| 7,229,129 B2 | * | 6/2007 | White et al. | 297/180.12 |
| 7,306,283 B2 | * | 12/2007 | Howick et al. | 297/180.12 |
| 7,452,028 B2 | * | 11/2008 | Knoll et al. | 297/180.1 |
| 7,506,924 B2 | * | 3/2009 | Bargheer et al. | 297/180.14 |
| 7,581,785 B2 | * | 9/2009 | Heckmann et al. | 297/180.14 |
| 7,673,935 B2 | * | 3/2010 | Nishide et al. | 297/180.14 |
| 7,695,062 B2 | * | 4/2010 | Stowe | 297/180.1 |
| 7,784,863 B2 | * | 8/2010 | Fallen | 297/180.14 |
| 7,967,377 B2 | * | 6/2011 | Truckenbrodt et al. | 297/217.3 |
| 2008/0036249 A1 | | 2/2008 | Heckmann et al. | |
| 2009/0140558 A1 | | 6/2009 | Fallen | |

FOREIGN PATENT DOCUMENTS

DE    10061027 A1    6/2002
DE    10160799 A1    9/2002

* cited by examiner

*Primary Examiner* — Laurie Cranmer

(74) *Attorney, Agent, or Firm* — Shook, Hardy & Bacon LLP

(57) ABSTRACT

A temperature-controlled head-restraint system is provided. A head restraint includes various layers of material, such as a core, cushion, and trim cover. Moreover, the head restraint includes a temperature-controlling layer that provides heat, coolness, ventilation, or a combination thereof to a front portion of the head restraint. The temperature-controlling layer might include one or more of a heater mat or reticulate material that disperses treated air.

17 Claims, 4 Drawing Sheets

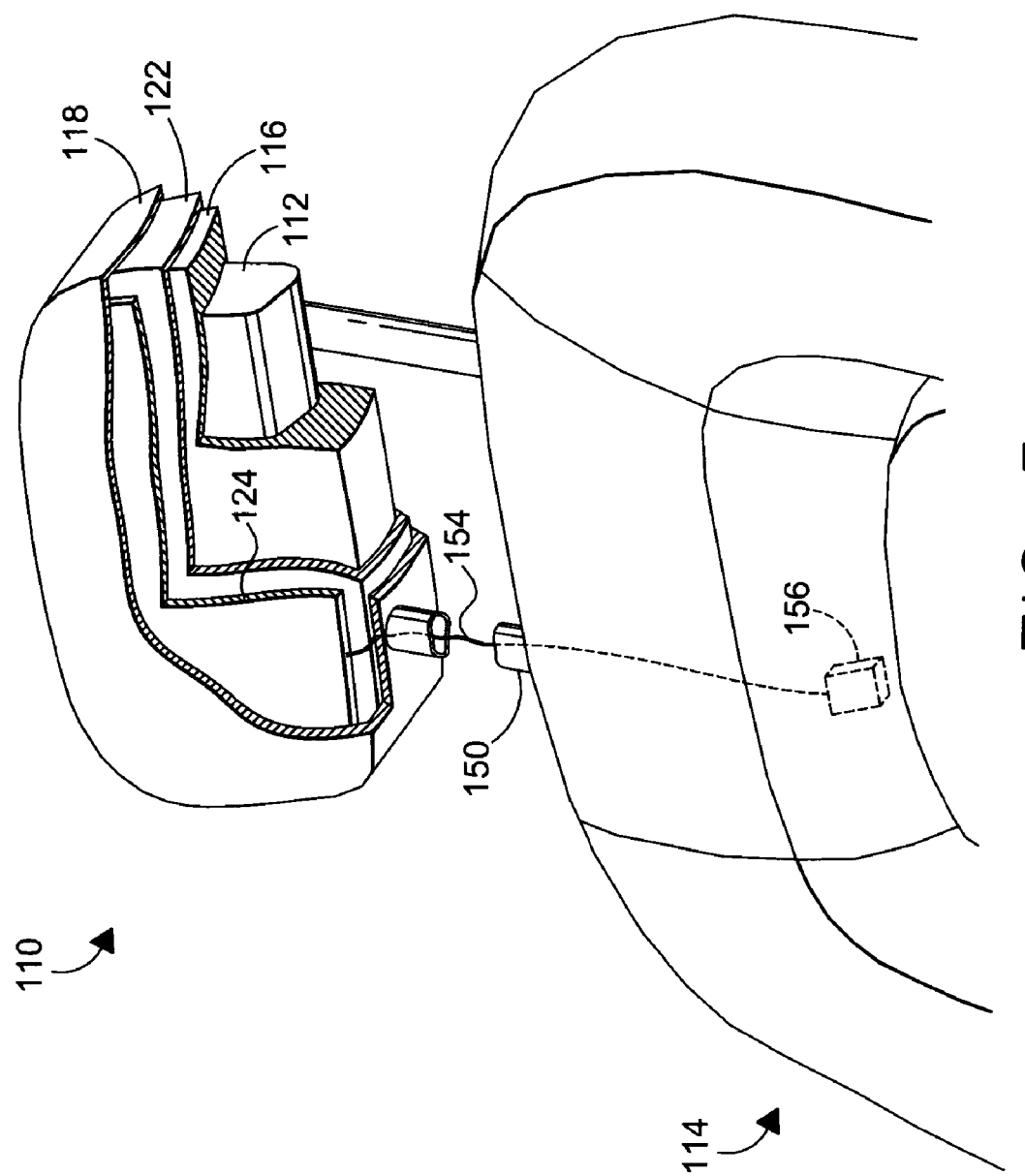

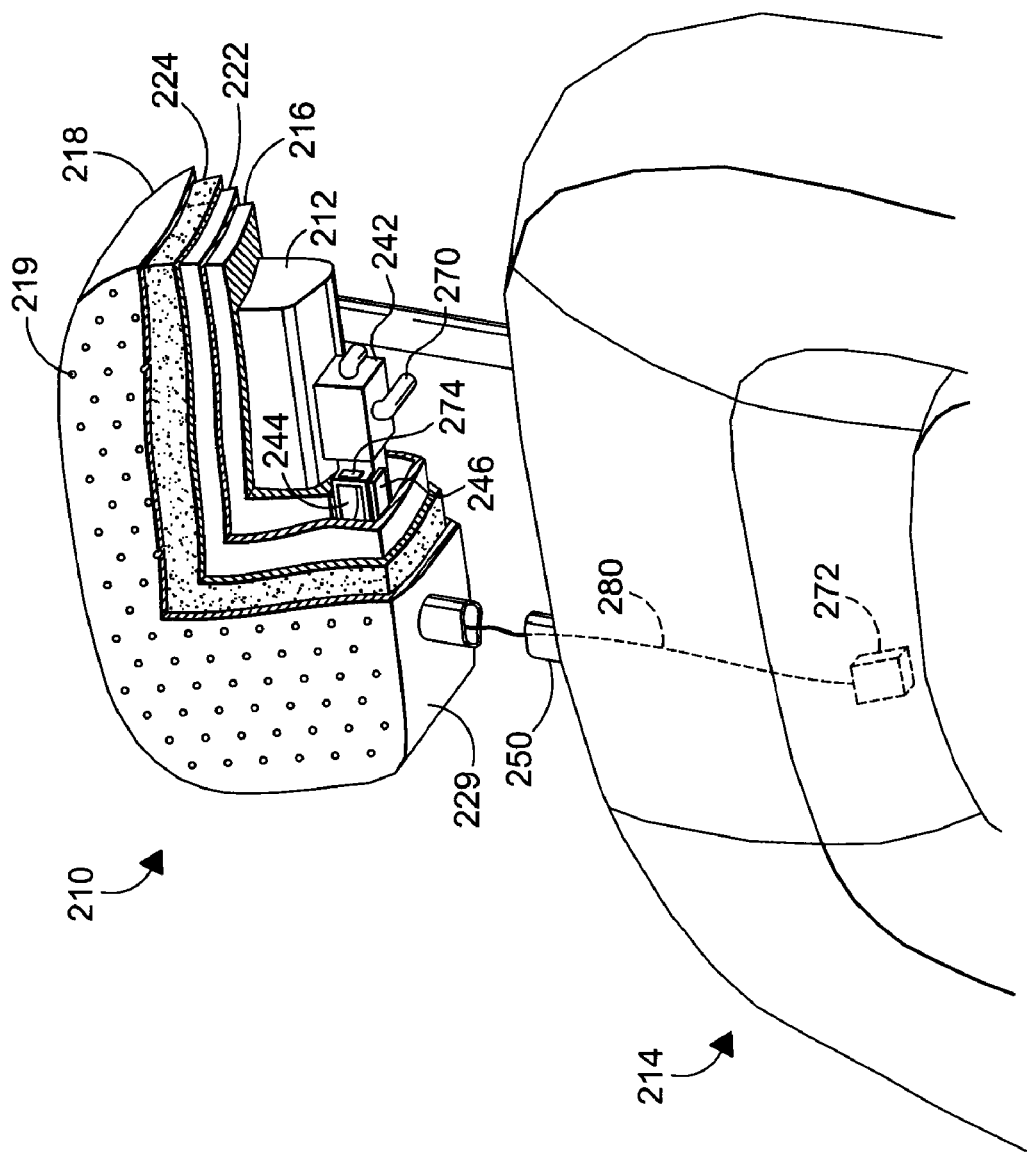

TEMPERATURE-AND-HUMIDITY-CONTROLLED HEAD RESTRAINT

TECHNICAL FIELD

The disclosed invention relates to a head restraint of a seat. More particularly, the disclosed invention relates to a head restraint configuration which allows a temperature of the head restraint to be controlled.

BACKGROUND

Various components of an automobile allow a temperature of interior portions of the automobile to be controlled. For example, vents are often strategically placed throughout the automobile interior to distribute warmed and cooled air. Moreover, automobile seat components often allow a temperature of a seat bottom and a backrest to be controlled. However, known technology does not efficiently and selectively heat or cool a seat region that is aligned with a user's neck. Because the back side of a human's neck is typically an area of the human body that is sensitive to temperature changes, an individual's comfort level can often be increased or decreased by either heating or cooling the individual's neck. Accordingly, technology is needed that efficiently and selectively provides heat, coolness, and ventilation to a region of a seat that is aligned with a user's neck.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify essential features of the claimed subject matter, nor is it intended to be used as an aid in isolation to determine the scope of the claimed subject matter. Other advantages and features of the invention will become apparent when viewed in light of the detailed description, the attached drawings, and the appended claims.

The present invention provides a temperature-controlled head-restraint system that is usable with a seat having a seatback. In an embodiment of the invention, the temperature-controlled head-restraint system includes a head-restraint body that is attachable to the seatback and that has a front. Moreover, the system includes a head-restraint core that is integrated within the body and a trim cover that is attached to the body. Furthermore, the system includes a temperature-controlling layer positioned between the front of the body and the trim cover. The temperature-controlling layer affects a temperature of the head restraint by providing heat, coolness, ventilation, or a combination thereof. The temperature-controlling layer might include a heater mat or a dispersing material (e.g., dispersing foam) that distributes treated air.

BRIEF DESCRIPTION OF THE DRAWINGS

Illustrative embodiments of the present invention are described in detail below with reference to the attached drawing figures, wherein:

FIGS. 3 and 4 each depict a perspective view of a respective embodiment of the temperature-controlled head restraint system showing a head restraint that is not integrated with a seatback.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different components similar to the ones described in this document, in conjunction with other present or future technologies.

Generally, an embodiment of the present invention is directed to a temperature-controlled head restraint system that is usable with a seat having a seatback. In an embodiment of the invention, the temperature-controlled head restraint system includes a head restraint body that is attachable to the seatback and that has a front. Moreover, the system includes a head restraint core that is integrated within the body and a trim cover that is attached to the body. Furthermore, the system includes a temperature-controlling layer positioned between the front of the body and the trim cover. The temperature-controlling layer affects a temperature of the head restraint by providing heat, coolness, ventilation, or a combination thereof. The temperature-controlling layer might include a heater mat or a dispersing material (e.g., dispersing foam) that distributes treated air. The various figures depict a single-user seat, which might be utilized in various applications, such as automotive seats, office chairs, aircraft seats, and water-craft seating. Moreover, even though a single-user seat is depicted, embodiments of the present invention are also applicable to multiuser seating, such as bench-style seats.

Figure 1:
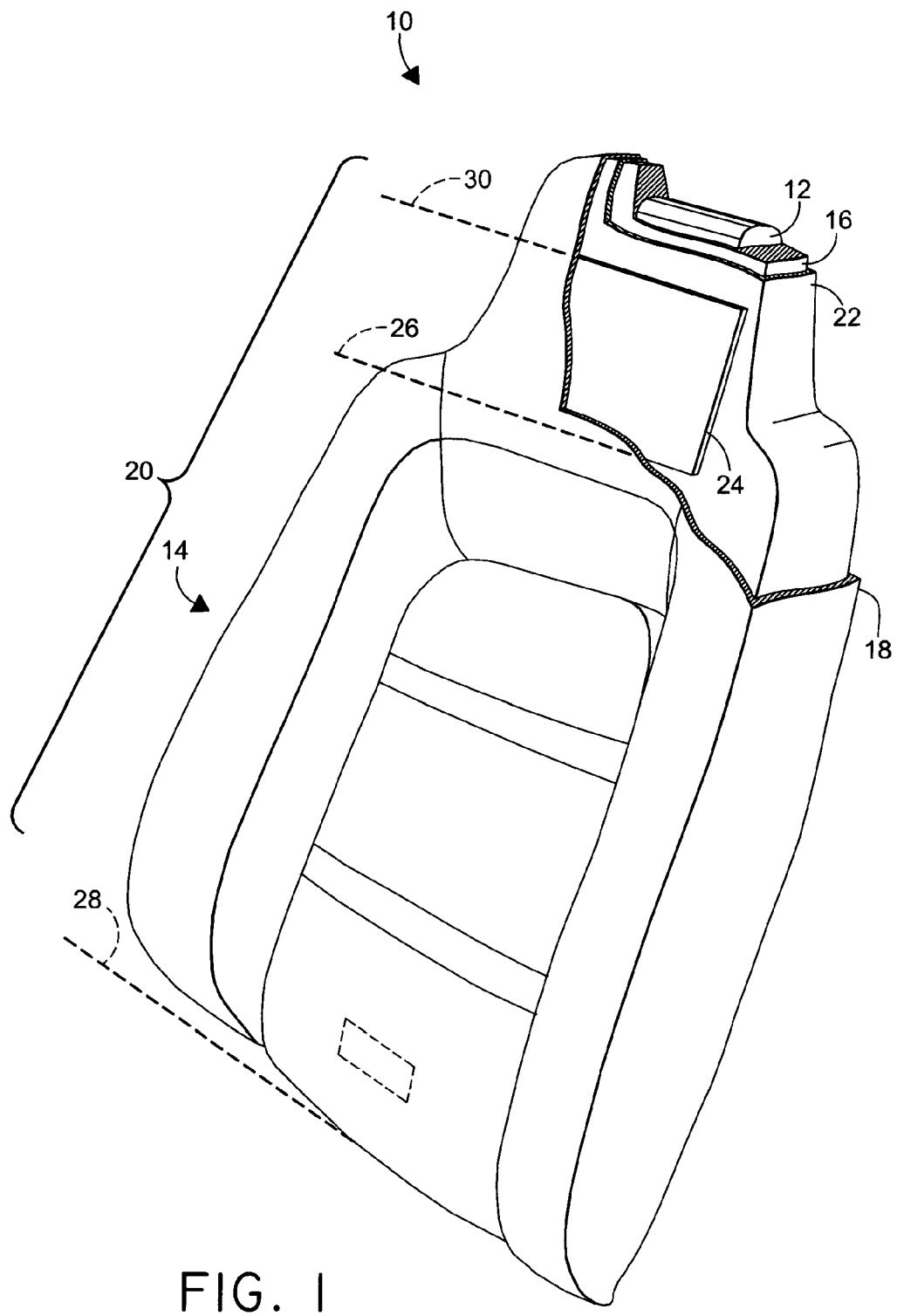
FIGS. 1 and 2 each depict a perspective view of a respective embodiment of the temperature-controlled head restraint system showing a head restraint integrated with a seatback.

Having briefly described a general embodiment of the present invention, alternative embodiments will now be described in more detail with reference to each figure. Referring to FIG. 1, a perspective view of an embodiment of the temperature-controlled head restraint system 10 (also referred to herein as "head restraint 10") is depicted in which layers of the head restraint 10 are illustrated as cut away to reveal various internal elements of the head restraint 10. Head restraint 10 is also identified as a "headrest" and the terms are used interchangeably herein. The head restraint 10 is integrated with a seatback 14, such that the head restraint 10 and the seatback 14 form a single unit 20. FIG. 1 depicts a head restraint body, which generally identifies various elements that are layered or otherwise combined to make up a integral structure of the head restraint. For example, the head restraint body might include a core, a form layer, and a cushion layer. Pursuant to FIG. 1, a head restraint core 12 is joined with core elements (not shown) of the seatback 14. For example, the head restraint core 12 and the core elements of the seatback 14 might be constructed as a single core element. In another example, the head restraint core 12 is fixedly mounted to the core elements of the seatback 14. Head restraint core 12 serves various functions, such as providing a rigid structural framework of the head restraint 10. For example, head restraint core 10 serves as a frame onto which other head rest components can be fixed. Head restraint core 10 might be constructed of any of a variety of suitable materials including wood, metal, and molded synthetic material.

Various layers of material at least partially encase the head restraint core 12. For example, a form-providing layer 16, which provides a shape of the restraint, at least partially encases the core. In an embodiment, the form-providing layer 16 is arranged directly adjacent to the head restraint core 12. In addition to providing a shape and framework of the restraint, the form-providing layer 16 might also provide firmer cushioning of the head restraint 10. The form-providing layer 16 includes any material that is suitable to accomplish these objectives. For example, the form-providing layer 16 might include foam that has a density and composition that make it suitable to provide a shape and framework of the head restraint 10 and to provide a firmer cushioning of the head restraint. At least partially encasing the form-providing layer 16 is a cushion-providing layer 22. The cushion-providing layer 22 is a thinner layer of material that serves as a topper pad of the head restraint 10 and provides softer cushioning of the head restraint 10. The cushion-providing layer 22 includes any material that is suitable to provide a desired level of cushioning of the head restraint 10. For example, the cushion-providing layer 22 might include foam that has a density and composition which make it suitable to provide a desired level of cushioning.

While FIG. 1 depicts two layers of material (i.e., layers 16 and 22), alternative embodiments might include fewer or no layers, or might include more than two layers. Moreover, while various types of foam are specifically described as materials that might encase the head restraint core 12, other types of material, such as molded synthetics and air bladders, might also be used to encase the head restraint core 12 and provide shaping and cushioning functionality.

A temperature-controlling layer 24 is positioned in a front portion of the head restraint 10 and between the head restraint core 12 and a trim cover 18 of the head restraint 10. More specifically, in FIG. 1 the temperature-controlling layer 24 is positioned between the trim cover 18 and the cushion-providing layer 22. The temperature-controlling layer 24 affects a temperature of the head restraint 10 by providing heat, coolness, ventilation, or a combination thereof. For example, the temperature-controlling layer 24 might include a heater mat. In addition to providing seatback-heating functionality, the temperature-controlling layer 24 is positioned to affect a temperature of the head restraint 10 at a position that is generally aligned with a back side of a typical seat-user's neck. Accordingly, in an embodiment of the present invention, the temperature-controlling layer 24 extends along a front portion of the single unit 20 and higher along the single unit 20 than typical heater mats. For example, in an embodiment of the invention, the temperature-controlling layer 24 extends along a front portion of the single unit 20 from a first position 26, which is approximately seven-tenths of a meter above a base position 28 of the single unit 20, to a second position 30 that is approximately one-fourth of a meter above the first position 26.

In an alternative embodiment, it might be desirable to include a head restraint heating zone that is independent from a seatback heating zone, since a seat user's neck is typically not clothed and is generally more sensitive. Accordingly, the head restraint heating zone might include a separate heating mat from a heating mat of the seatback heating zone. The separate heating mat might include separate controls that allow a desired temperature of the head restraint heating zone to be independently selected. Alternatively, where a single mat is utilized to heat both the head restraint and the seatback, the head restraint heating zone might include additional material between a heating element of the heating mat and the trim cover 18, or might include separate controls that allow the temperature of the head restraint heating zone to be selected independent from the seatback heating zone.

Figure 2:
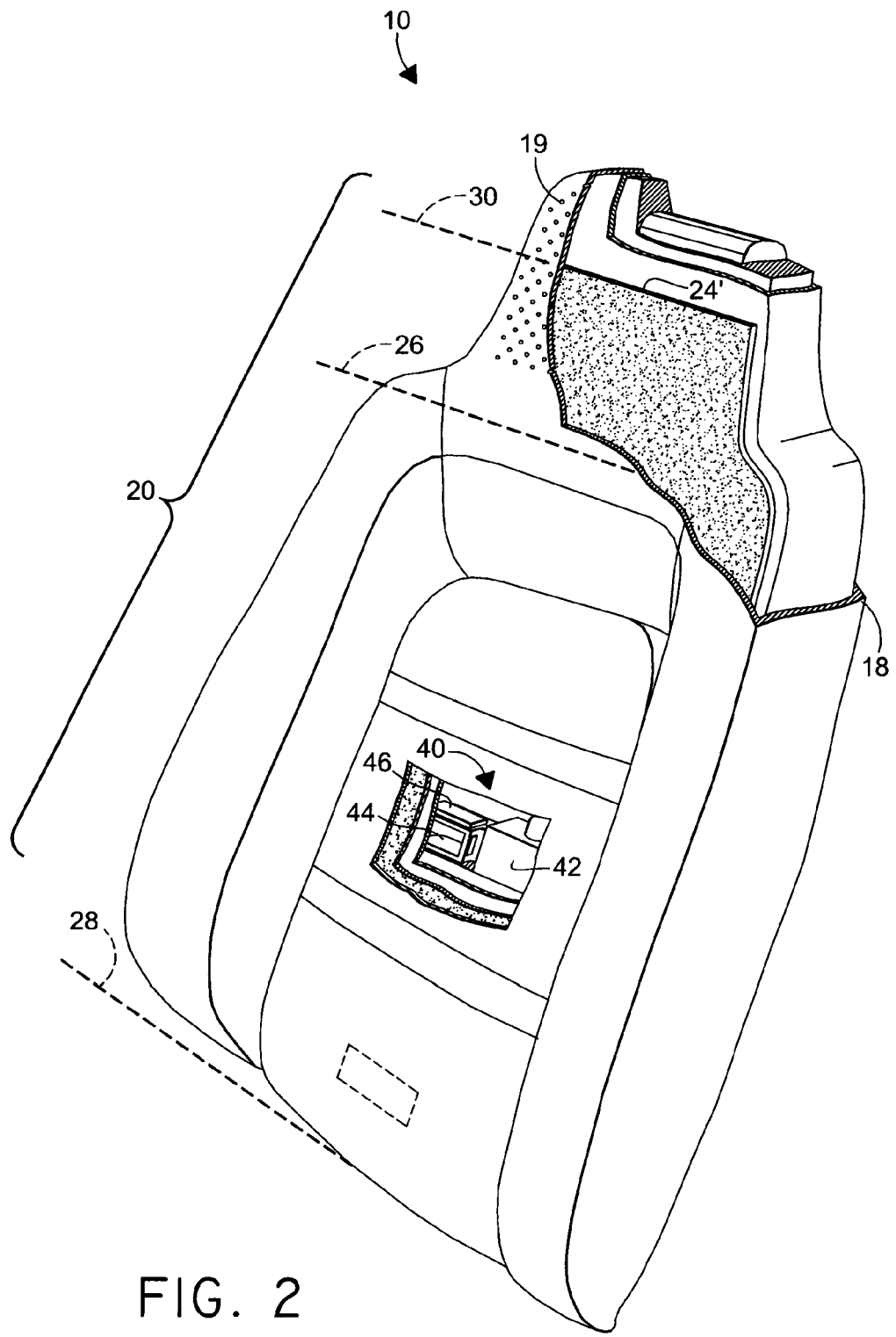

Referring now to FIG. 2, an embodiment similar to FIG. 1 is depicted; however, FIG. 2 depicts an alternative temperature-controlling layer 24'. Moreover, FIG. 2 depicts in an air treatment component 40, which is positioned in a portion of the seatback. In one embodiment, air treatment component 40 includes a blower 42, a duct 44, and a thermoelectric module 46. The blower 42 blows air through the duct 44, to which the thermoelectric module 46 is coupled. The thermoelectric module 46 selectively heats and cools the air that is blown through duct 44, thereby generating treated air. As used herein "treated air" refers to air that has been either heated or cooled, such as by the thermoelectric module to achieve a desired temperature. The treated air passes out of the duct and interacts with the temperature-controlling layer 24'. In an embodiment of the present invention, the temperature-controlling layer 24' includes reticulated material, such as reticulated foam, that functions to disperse the treated air to the head restraint 10. Moreover, as depicted by an aperture 19, the trim cover 18 is perforated to facilitate diffusion of treated air, heat, or a combination thereof through the trim cover 18.

In another embodiment, a fan rotation of the blower 42 is reversible to absorb or suck air (e.g., warm air and moisture) through the apertures of the trim cover 18, thereby providing ventilation. While the thermoelectric module 46 is described herein, in other embodiments the air treatment component 40 might include alternative components that selectively heat, cool, or a combination thereof. For example, alternative components might only selectively heat air that is blown from the blower to provide a heating effect and might absorb warm air to provide a cooling effect.

Similar to FIG. 1, FIG. 2 illustrates that the temperature-controlling layer 24' extends along a front portion of the single unit 20 to a position generally aligned with a back side of a typical seat-user's neck. For example, the reticulated material extends within the single unit 20 from a first position 26, which is approximately seven-tenths of a meter above a base position 28 of the single unit 20, to a second position 30 that is approximately one-fourth of a meter above the first position 26 of the single unit 20. Because the head restraint region of the temperature-controlling layer 24' (i.e., the region between the first position 26 and the second position 30) is generally aligned with a typical seat-user's neck, the head restraint region might be modified to provide a different amount of heat or coolness. For example, the reticulated material 24' of the head restraint region might include a density or a thickness that is different from the reticulated material of the seatback region.

Referring to FIG. 3, another embodiment of a temperature-controlled head restraint 110 is depicted in which layers of the head restraint 110 are illustrated as cut away to reveal various internal elements of the head restraint 110. The head restraint 110 includes a head restraint core 112 fixed to a post 150 atop a seatback 114. Head restraint core 112 serves various functions, such as providing a rigid structural framework of the head restraint 110. For example, head restraint core 110 serves as a frame onto which other head rest components (e.g., post 150) can be fixed. Head restraint core 110 might be constructed of any of a variety of suitable materials, including wood, metal, and molded synthetic material. An upper portion of post 150 is coupled to the head restraint 110. For example, the upper portion of post 150 might be attached to the head restraint core 112 via a mounting bracket (not shown). The post 150 might include a telescoping design that allows the head restraint 110 to be raised and lowered relative to the seatback 114. Alternatively, post 150 might extend through a top surface of the seatback 114, such as through a guide sleeve (not shown) that includes a receiving channel that receives the post 150. Post 150, or the guide sleeve, might be barbed to allow the guide sleeve to engage the post 150 at different positions, thereby providing alternative height adjustments of the head restraint 110.

Various layers of material at least partially encase the head restraint core 112. For example, a form-providing layer 116, which provides a shape of the head restraint 110, at least partially encases the head restraint core 112. In an embodiment, the form-providing layer 116 is arranged directly adjacent to the head restraint core 112. In addition to providing a shape and framework of the restraint, the form-providing layer 116 might also provide firmer cushioning of the head restraint 110. The form-providing layer 116 includes any material that is suitable to accomplish these objectives. For example, the form-providing layer 116 might include foam having a density and composition which make it suitable to provide a shape and framework of the head restraint 110 and to provide a firmer cushioning of the head restraint. At least partially encasing the form-providing layer 116 is a cushion-providing layer 122. The cushion-providing layer 122 is a thinner layer of material that serves as a topper pad of the head restraint 110 and provides softer cushioning of the head restraint 110. The cushion-providing layer 122 includes any material that is suitable to provide a desired level of cushioning of the head restraint 110. For example, the cushion-providing layer 122 might include foam that has a density and composition which make it suitable to provide a desired level of cushioning.

In an embodiment of the present invention, a heater mat 124 is positioned in a front portion of the head restraint 110 and adjacent to cushion-providing layer 122. Moreover, a head restraint trim cover 118 covers the heater mat 124. The heater mat 124 heats the trim cover 118, which in turn diffuses heat to a seat user. In an embodiment of the present invention, a heater-mat power connection 154 provides power from a power source 156 to the heater mat 124. For example, the heater-mat power connection 154 might comprise a power cord that extends coaxially with the post 150. As depicted in FIG. 3 by a cut away view of the post 150, the power connection 154 might extend through a center of the post 150. Alternatively, the power connection 154 might extend through a guide sleeve (not shown) of the post 150. While the power source 156 is depicted as a local power source that is positioned in the seatback 114, in other embodiments the power source might be any power source of a vehicle in which the head restraint is installed.

In an embodiment of the present invention, the heater mat 124, which is independent of other heater mats that might be used to heat other portions of the seat (e.g., seatback and seat bottom), is connected to independent controls. The independent controls allow the temperature of heater mat 124, which is generally aligned with the back side of a typical user's neck and head, to be controlled independently from heater mats aligned with other portions of the user's body. As such, the power source 156 is controllable to independently select a temperature of the head restraint 110.

Referring to FIG. 4, another embodiment of a temperature-controlled head restraint 210 is depicted in which layers of the head restraint 210 are illustrated as cut away to reveal various internal elements of the head restraint 210. Similar to FIG. 3, FIG. 4 depicts a head restraint core 212 fixed to a post 250 atop a seatback 214; however, FIG. 4 depicts an alternative mechanism to control a temperature of the head restraint 210.

In an embodiment of the invention, a blower 242 is positioned proximate to the head restraint core 212. For example, the blower 242 is depicted directly beneath the head restraint core 212; however, the blower might alternatively be positioned to a side of the head restraint core 212, in front of the head restraint core 212, or above the head restraint core 212, all of which are proximate to the head restraint core 212. The blower 242 might be fixed in position in various ways. For example, the blower 242 might be mounted to the head restraint core 212 or to the post 250. In addition, the blower 242 might be held in position by a form-providing layer 216, which at least partially encases the blower 242 and the head restraint core 212.

As described with respect to FIG. 2, in an embodiment depicted in FIG. 4 the blower 242 blows air through a duct 244, to which a thermoelectric module 246 is coupled. The thermoelectric module 246 selectively heats and cools the air that is blown through duct 244, thereby generating treated air. Alternatively, the fan rotation of the blower 242 might be reversed to absorb air (e.g., warm air and moisture) that is exterior to the head restraint 210, thereby providing ventilation. In an embodiment of the present invention, the thermoelectric module 246 is connected to a controller 272 that selectively determines whether the thermoelectric module 246 will heat or cool air and whether the blower 242 will function to blow or pull air. In one embodiment, the controller 272 is connected to a sensor 274, which is positioned on the duct 244. The sensor 274 measures a temperature of the treated air and communicates the measured temperature to the controller 272. The controller 272 includes a thermostat mechanism that determines whether the thermoelectric module 246 should heat or cool air and whether the blower 242 should function based on the measured temperature. In an embodiment of the invention, the controller 272 allows a desired temperature of the temperature-controlled head restraint 210 to be selected and controlled independently of a seatback temperature. FIG. 4 depicts the controller 272 positioned in the seatback. As such, the sensor 274 and the blower 242 communicate with the controller 272 via a set of control wires 280, which extends coaxially with the post 250. For example, the control wires 280 might extend through a center of the post 250, as depicted in FIG. 4. Alternatively, the control wires 280 might extend through a guide sleeve of the post 250. In an embodiment of the present invention, the set of control wires 280 also include a power cord that provides a power connection to a power source (not depicted in FIG. 4).

In an embodiment of the present invention, the treated air passes out of the duct 244 and interacts with layers of the head restraint 210. For example, an opening of the duct 244 might be positioned so that the treated air interacts with a cushion-providing layer 222, which at least partially encases the form-providing layer 216. For example, FIG. 4 depicts the cushion-providing layer 222 covering the opening of the duct 244. The cushion-providing layer 222 is at least partially covered by reticulated material 224 (e.g., reticulate foam) that functions to disperse the treated air throughout portions of the head restraint 210, such as the front portion of the head restraint 210. Head restraint trim cover 218 at least partially covers the reticulate material 224. As depicted by an aperture 219, trim cover 218 is perforated to facilitate diffusion of treated air through the trim cover 218.

In an embodiment of the present invention, the blower 242 is coupled to an exhaust duct 270, which expels air (e.g., waste air or absorbed air) from the blower. The exhaust duct 270 is depicted as directing air backward, i.e., out the back side of the head restraint 210. However, in an alternative embodiment, the exhaust duct 270 might direct air out of a bottom 229 of the head restraint 210.

Many different arrangements of the various components depicted, as well as components not shown, are possible without departing from the scope of the claims below.

Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A temperature-controlled head-restraint system for a seat having a seatback, the system comprising:
   a head-restraint body attached to the seatback, the head-restraint body having a front;
   a head-restraint core integrated within the body;
   a trim cover attached to the body; and
   a temperature-controlling layer positioned between the front of the body and the trim cover, the temperature-controlling layer affecting a temperature of the temperature-controlled head-restraint system by providing heat, coolness, ventilation, or a combination thereof,
      wherein the temperature-controlling layer extends along the front above a first position, which is approximately seven-tenths of a meter above a base of the seatback, and
      wherein the temperature controlling layer above the first position is controlled, independently of another temperature-controlling layer positioned below the first position, to affect the temperature.

2. The temperature-controlled head-restraint system of claim 1, wherein the head-restraint body includes a form-providing layer that provides a shape of the head-restraint body and that at least partially encases the head-restraint and wherein the form-providing layer is at least partially encased by a cushion-providing layer that is positioned adjacent to the temperature-controlling layer.

3. The temperature-controlled head-restraint system of claim 2, wherein the temperature-controlling layer includes a heater mat positioned beneath the trim cover.

4. The temperature-controlled head-restraint system of claim 2, wherein the temperature-controlling layer includes reticulated foam positioned beneath the head-restraint trim cover.

5. The temperature-controlled head-restraint system of claim 4, wherein the reticulated foam extends along the front of the body from a first position, which is approximately seven-tenths of a meter above a base of the seatback, to a second position that is approximately one-quarter of a meter above the first position.

6. The temperature-controlled head-restraint system of claim 4, wherein the head-restraint trim cover is perforated.

7. The temperature-controlled head restraint of claim 4, wherein the reticulated foam disperses treated air to the head-restraint trim cover.

8. A temperature-controlled head-restraint system for a seat having a seatback, the system comprising:
   a head-restraint body affixed atop one or more head-restraint posts, which are attachable to the seatback, the head-restraint body having a front and the head-restraint body including:
      (1) a head-restraint core integrated within the head-restraint body, the head-restraint core providing a structural frame of the system;
      (2) a form-providing layer providing a shape of the head-restraint body and at least partially encasing the core; and
      (3) a cushion-providing layer at least partially encasing the form-providing layer;
   a trim cover at least partially encasing the head-restraint body; and
   a heater mat positioned between the front of the head-restraint body and the trim cover, the heater mat being connected to a heater-mat power connection that is controllable independently from another power connection supplying power to another heating mat positioned in the seatback.

9. The temperature-controlled head-restraint system of claim 8, wherein the heater-mat power connection provides power from a power source to the heater mat.

10. The temperature-controlled head-restraint system of claim 9, wherein the heater-mat power connection includes a power cord that extends coaxially with the post.

11. The temperature-controlled head-restraint system of claim 10, wherein the power cord extends through a center of the post.

12. A temperature-controlled head-restraint system for a seat having a seatback, the system comprising:
   a head-restraint body affixed at a bottom portion atop one or more head-restraint posts, which are attachable to the seatback, the head-restraint body having a front and the head-restraint body including:
      (1) a head-restraint core integrated within the head-restraint body, the head-restraint core providing a structural frame of the system;
      (2) a form-providing layer providing a shape of the head-restraint body and at least partially encasing the core; and
      (3) a cushion-providing layer at least partially encasing the form-providing layer;
   a blower positioned proximate to the core and at least partially encased by the form-providing layer, the blower comprising a duct that extends to the cushion-providing layer, an exhaust duct that expels air from the blower, and a controller that controls a provision of power to the blower,
      wherein the exhaust duct expels air downward and out of the bottom portion of the head restraint, and
      wherein the controller is selectively controllable to provide power to the blower independently of a different controller, which selectively provides power to a different blower positioned in the seatback; and
   reticulated material in communication with the cushion-providing layer, the reticulated material positioned at the front of the head-restraint body.

13. The temperature-controlled head-restraint system of claim 12 further comprising a thermoelectric module coupled to the duct that cools and heats air that is blown from the blower, thereby generating treated air, which is dispersed by the reticulate material.

14. The temperature-controlled head-restraint system of claim 12 further comprising a perforated head-restraint trim cover that at least partially encases the reticulated material.

15. The temperature-controlled head-restraint system of claim 12 further comprising a sensor positioned on the duct, wherein the sensor measures a temperature of air in the duct.

16. The temperature-controlled head-restraint system of claim 15, wherein the sensor communicates with the controller that selectively provides power to the blower.

17. The temperature-controlled head-restraint system of claim 16, wherein the controller enables a desired temperature of the temperature-controlled head-restraint system to be selected independently of a seatback temperature.

* * * * *